March 13, 1973 M. L. TALBERT Re. 27,597

LARGE-DIAMETER EARTH BORING BIT

Original Filed March 9, 1970 3 Sheets-Sheet 1

PRIOR ART

INVENTOR
MILTON L. TALBERT

ATTORNEY

INVENTOR

MILTON L. TALBERT

Pollie E. Scott

ATTORNEY

LARGE-DIAMETER EARTH BORING BIT

Original Filed March 9, 1970 3 Sheets-Sheet 3

INVENTOR
MILTON L. TALBERT
Pollie F. Scott
ATTORNEY

United States Patent Office

Re. 27,597
Reissued Mar. 13, 1973

27,597

LARGE-DIAMETER EARTH BORING BIT

Milton L. Talbert, China Springs, Tex., assignor to Dresser Industries, Inc., Dallas, Tex.

Original No. 3,633,691, dated Jan. 1, 1972, Ser. No. 17,663, Mar. 9, 1970. Application for reissue Apr. 4, 1972, Ser. No. 242,148
Int. Cl. E21b *9/24;* E21c *23/00;* E21d *3/00*
U.S. Cl. 175—334 12 Claims

Matter enclosed in heavy brackets [ ] appears in the original patent but forms no part of this reissue specification; matter printed in italics indicates the additions made by reissue.

ABSTRACT OF THE DISCLOSURE

A bit for drilling large-diameter holes. Cutters are arranged in a staged configuration around a central shaft. The innermost cutters are the same large cutters used at other locations on the bit allowing complete interchangeability. The innermost cutters are turned inward. This reduces the uncut bottom next to the pilot hole and provides a stronger bit because the central shaft has not been weakened by milling or other operations.

BACKGROUND OF THE INVENTION

This invention relates to the art of earth boring and more particularly to an improved bit for drilling large-diameter holes. The bit of this invention is generally used in a boring operation wherein a relatively small pilot hole is first drilled and the hole enlarged by a subsequent reaming operation utilizing the improved bit.

In bits of this character, it has been found desirable to employ a number of small rolling or rotatable cutters rotatably mounted on a main bit body. The cutters are located and spaced so that upon rotation of the bit every portion of the hole being drilled will be acted upon by one or more of the cutters to disintegrate the formation. This insures that almost the entire wear of drilling takes place on the cutters rather than on the main bit body. The cutters should be readily replaceable thereby allowing the life of the bit to be extended by replacing the cutters.

This type of bit is sometimes referred to as a "raise bit" because of its extensive use in boring raise holes between levels of an underground mine. The term "raise" may have been applied to this type of operation because a pilot hole was drilled from one level of a mine down to another level and the hole enlarged by a raising operation on the upward pass. The bit of this invention may be used for boring raise holes and in other operations wherein a large-diameter hole is desired. This may include boring at any angle to the horizontal either up or down and with or without a pilot hole.

Many strict requirements are imposed upon a bit to be used in boring large-diameter holes. The bit must be a balanced high-performance apparatus that is rugged and will perform for a long period of time. It is desirable to have a majority of the elements wear out at about the same time without premature failure of any one element. The bit is repeatedly subjected to high stress and the particular geometry of the bit imposes limitations upon the structural elements that are exposed to the stress.

DESCRIPTION OF THE PRIOR ART

The prior art is in general represented by U.S. Pat. No. 3,220,494 to R. E. Cannon et al., patented Nov. 30, 1965. The system shown by the Cannon et al. patent includes a rotary drilling apparatus for rotating and hydraulically raising a raise cutter head along a pilot hole to form a raise hole between a lower level and an upper level of a mine.

The raise cutter head enlarges the pilot by reaming with its plurality of staged cutters.

Large-diameter bits of the prior art have used different sized cutters. The inner cutters were generally smaller than the other cutters because they had to be located as close to the central shaft as possible and the smaller the cutter the closer it could be to the central shaft. The use of different sized cutters creates problems, however, because they tend to wear out at different times and it is difficult to provide a small cutter that will withstand the high stresses encountered.

SUMMARY OF THE INVENTION

The bit of this invention has a plurality of stages with each stage having a series of cutters surrounding a central shaft. The consecutive stages progressively increase in diameter thereby allowing a pilot hole to be enlarged to the desired size. The staged configuration provides a stabilizing effect which reduces wandering of the bit as drilling proceeds and helps maintain a smooth drilling operation.

The individual cutters are removable which allows parts to be replaced without replacing the entire structure. The bit of this invention allows large cutters to be used on the innermost stage, thus providing complete interchangeability of cutters on the bit which results in a bit that is stronger than those of the prior art. The use of large cutters on all stages of the bit also provides simplicity and economy to the drilling operation.

The innermost cutters are turned inwardly. This provides room for the saddle support next to the stem and consequently a stronger bit. There is little, if any, need to mill or relieve into the central shaft. In addition, the unique inner cutters insure that there will be very little, if any, uncut bottom next to the pilot hole.

The cutters may be located close together which results in a bit that is more compact than those of the prior art. The compactness provides simplicity, economy and a bit that is stronger than those of the prior art.

It is therefore an object of the present invention to provide a bit for boring large-diameter holes that is stronger and more efficient than those of the prior art.

It's a further object of the present invention to provide a bit for drilling large-diameter holes that has interchangeable cutters.

It is a further object of the present invention to provide a bit for drilling large-diameter holes that is more compact than those of the prior art.

It is a still further object of the present invention to provide greater economy in boring large-diameter holes.

It is a still further object of the present invention to provide a bit for drilling large-diameter holes that eliminates the problems associated with having portions of uncut bottom next to the stem.

The above and other objectives and advantages will become apparent from a consideration of the following detailed description when taken in conjunction with the accompanying drawing.

DETAILED DESCRIPTION OF THE INVENTION

Figure 1:
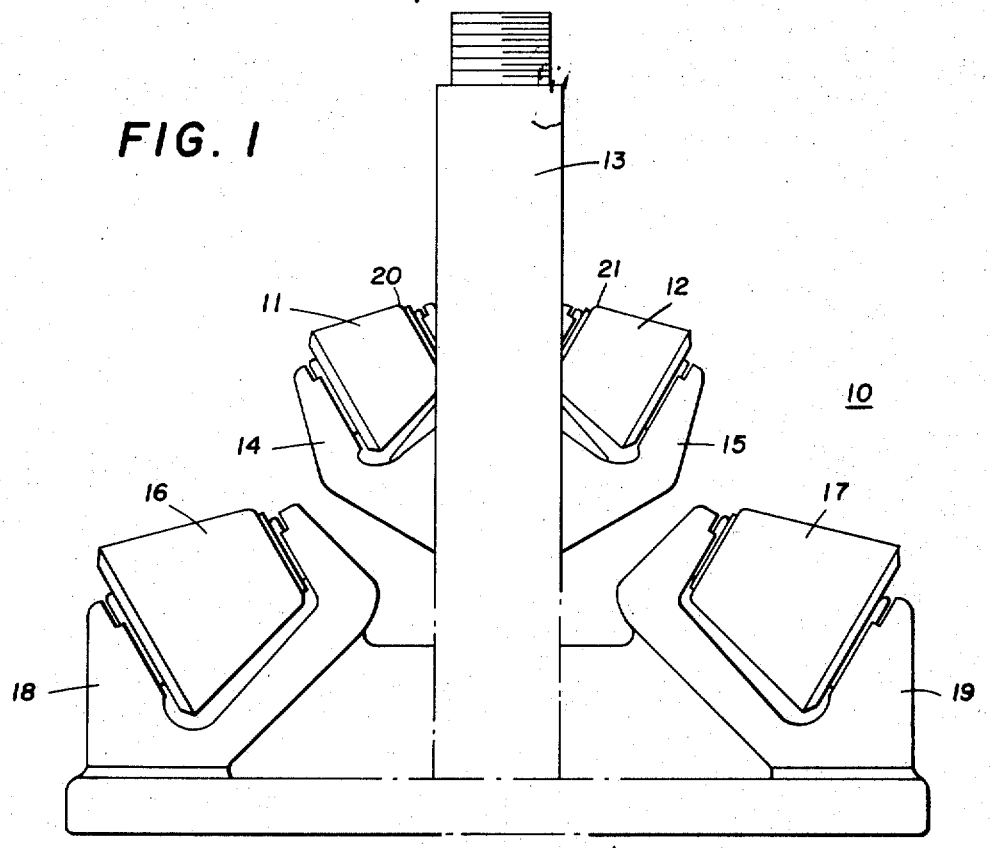
FIG. 1 shows a bit of the prior art.

Referring now to FIG. 1, a bit of the prior art is shown generally at 10. Two small inner cutters 11 and 12 are positioned next to the central shaft 13 and function as the first cutting stage. At least two cutters are used to insure a balanced drilling bit and a smooth drilling operation. Cutters 11 and 12 are held in position by saddles 14 and 15 which are mounted on central shaft 13. The saddles 14 and 15 allow the cutters to be easily removed and new cutters inserted. An example of a removable cutter and saddle system is shown in U.S. Pat. No. 3,203,492 to C. L. Lichte, patented Aug. 31, 1965. A second cutting stage is located below the first stage and includes two large cutters 16 and 17 mounted in saddles 18 and 19.

The central shaft 13 extends through a pilot hole having a diameter slightly larger than the diameter of shaft 13. The bit 10 is rotated by means of a system well known in the art. As bit 10 rotates the cutters 11, 12, 16 and 17 contact and disintegrate the formation as the bit is moved along the pilot hole. The cutting surfaces of cutters 11, 12, 16 and 17 must traverse the entire surface of the hole being bored and the saddles and other portions of the bits must not contact the formations being drilled. In order to accomplish this the inside cutting edges 20 and 21 of cutters 11 and 12 must be as close to central shaft 13 as possible and cutters 16 and 17 of the second cutting stage must be positioned with their inside cutting edges below the outside cutting edges of cutters 11 and 12. Consequently the inside cutters 11 and 12 are limited in size and the central shaft must have a recess to accommodate saddles 14 and 15.

Figure 2:
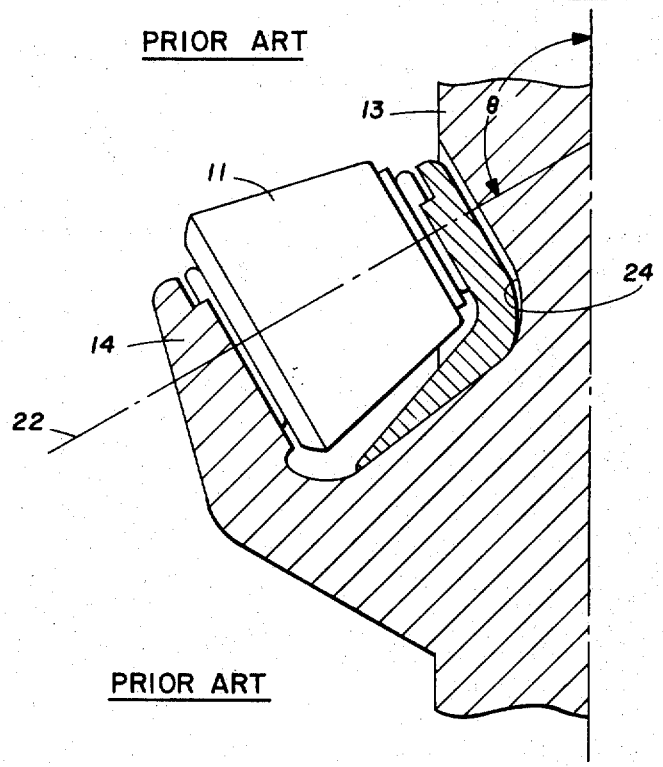
FIG. 2 PRIOR ART
FIG. 2 is an enlarged view of one of the small inner cutters of the prior art bit shown in FIG. 1.

Referring now to FIG. 2, one of the inner cutters of the first stage is shown in greater detail. To insure that saddle 14 does not contact the formation being drilled, the axis 22 of cutter 11 is at an angle $\theta$ to axis 23 of the central shaft 13. The angle $\theta$ must be greater than 90° and is generally in the range of 120° to 130°. The central shaft 13 must include a recess 24 to accommodate saddle 14 and cutter 11. The recess 24 weakens the central shaft 13 and is therefore undesirable.

Figure 3:
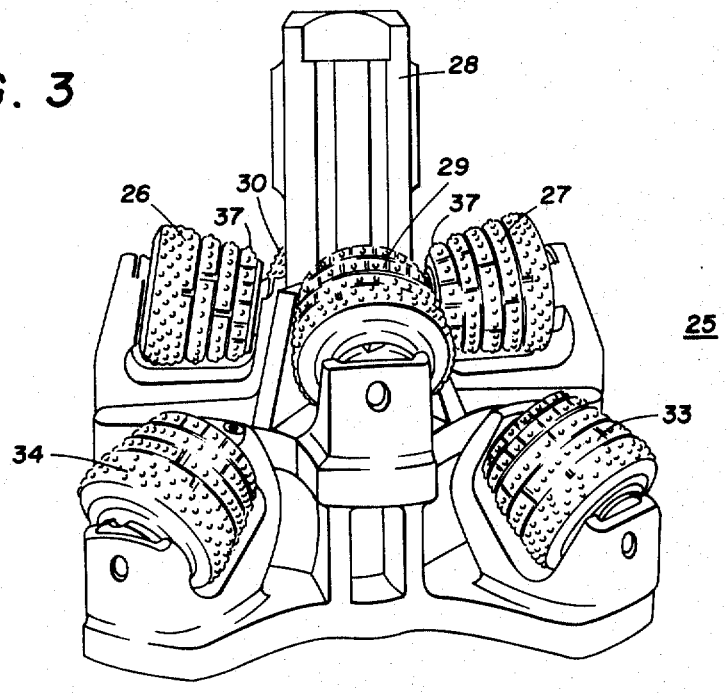
FIG. 3 shows one embodiment of the present invention.

Referring now to FIG. 3, one embodiment of the present invention is shown generally at 25. One pair of inner cutters 26 and 27 are positioned next to the central shaft 28. This pair of cutters 26 and 27 is turned inward in a manner that will be explained more fully with regard to FIG. 5. A second pair of cutters 29 and 30 are included in the first stage. Cutters 29 and 30 are turned outward in the conventional manner but are set out from the central shaft 28 a sufficient distance to accommodate the saddles of cutters 29 and 30 without requiring a recess in the central shaft 28. Cutters 31, 32, 33 and 34 make up the second stage in a manner similar to that described in connection with FIG. 1.

Figure 4:
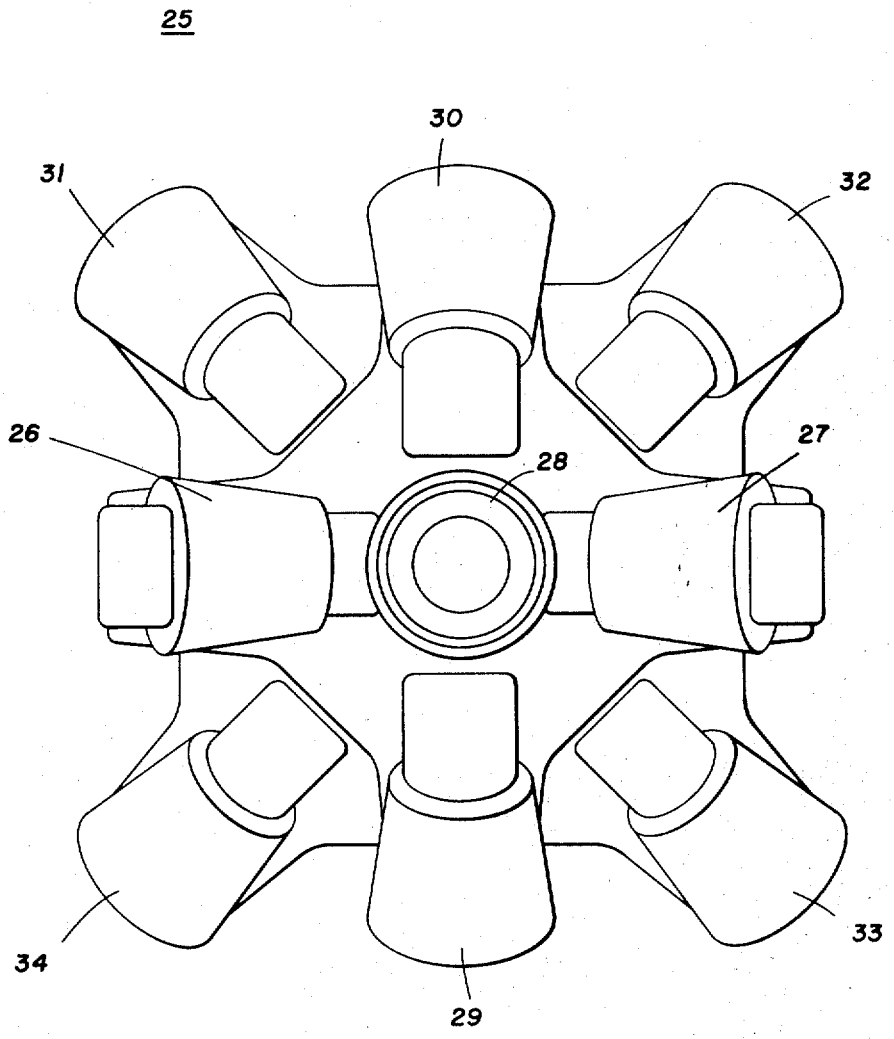
FIG. 4 is a top view of the bit shown in FIG. 3.

A top view of bit 25 is shown in FIG. 4. Inner cutters 26 and 27 are positioned on opposite sides of central shaft 28 and turned inward. The other pair of inner cutters 29 and 30 of the first stage are set out from central shaft 28 and turned outward. The second stage including cutters 31, 32, 33, and 34 is located below the other cutters and spaced to provide a balanced bit. It can be appreciated that as the bit is rotated the cutters will contact all portions of the formation to insure a uniform drilling operation.

Figure 5:
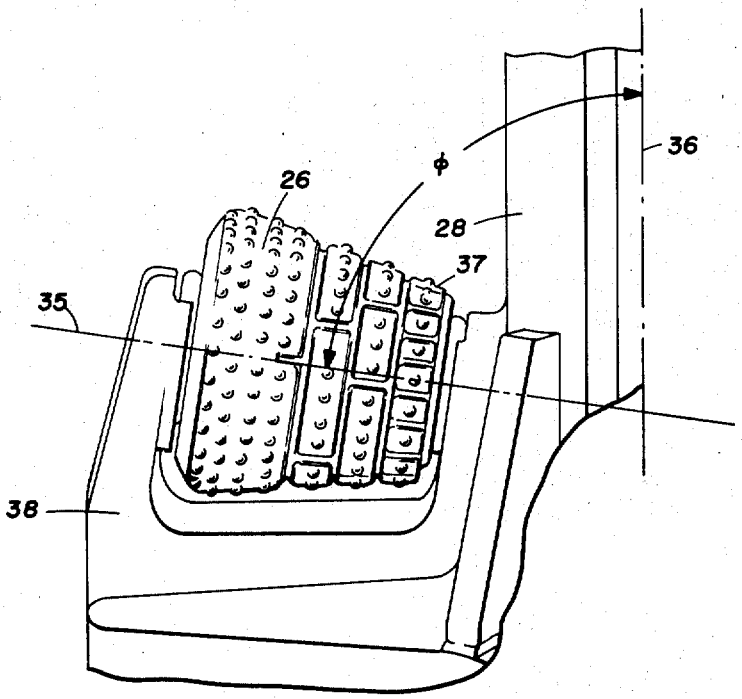
FIG. 5 is an enlarged view of one of the inner cutters of the bit of the present invention.

One of the inner cutters 26 is shown in greater detail in FIG. 5. The axis 35 of cutter 26 is at an angle $\phi$ to the axis 36 of shaft 28. The angle $\phi$ is less than 90° and in this embodiment is an angle of 57°. It is be understood that $\phi$ in this embodiment is an angle of 57°. It is to be understood that $\phi$ may be an angle other than 57° and in general is within the range of from 45° to 90°. The cutter 26 is the same size as large cutter used at other locations on the bit 25. This incorporates all of the advantages of using large cutters including complete interchangeability, greater strength, economy and a larger cutting area. The inner edge 37 of cutter 26 is located close to central shaft 28 insuring that there will be very little, if any, uncut bottom next to the central shaft. In circumstances wherein a small amount of uncut bottom remains between point 37 and stem 36, the formation will break away much easier than when using bits of the prior art. Any uncut bottom with bits of the prior art such as the bit shown in FIG. 1 will be larger than with a bit of this invention. In addition, the uncut bottom will have greater support from the formation above because the cutter is at an obtuse angle. The saddle 38 supporting cutter 26 is positioned next to central shaft 28 without a large recess to accommodate it. This results in a stem that is stronger than those of the prior art and in general a bit that is stronger, more efficient and compact than those of the prior art.

Referring again to FIG. 3, the operation of bit 25 will be described. The bit 25 is rotated and moved along a pilot hole according to a system well known in the art. The first pair of inner cutters 26 and 27 contact the formations nearest the central shaft and disintegrate them as the bit is moved along the pilot hole. It is to be understood that any number of cutters may be used to carry out this operation. The bit should be balanced so as to insure a smooth boring operation and in order to balance the bit a plurality of cutters should be used, spaced at regular intervals around the central shaft. The second pair of inner cutters 29 and 30 contact the formations at a point spaced from the central axis. Cutters 29 and 30 may be slanted outward in the conventional manner described in connection with FIG. 1. The cutters 29 and 30 disintegrate the formations as the bit is moved along the pilot hole and protect the saddles supporting cutters 26 and 27. In order to maintain a balanced bit it is to be understood that a plurality of cutters spaced at regular intervals may be utilized as previously discussed. The second stage of cutters, including cutters 31, 32, 33 and 34, trail the first stage and enlarge the hole to the desired size. It is to be understood that more than two stages may be provided if a still larger hole is desired and that two stages are shown for illustration purposes.

The embodiments of the invention in which an exclusive property or privilege is claimed are defined as follows:

1. A bit for enlarging a pilot hole into a large-diameter hole comprising:

a central shaft having a central longitudinal axis;

a main bit body attached to said central shaft, said main bit body including a plurality of drilling stages progressively increasing in size;

the first of said drilling stages including a pair of rolling cutters, removably mounted in a corresponding pair of saddles, the axis of rotation of said rolling cutters turned inward at an acute angle to the central longitudinal axis of said shaft; and a second pair of rolling cutters, removably mounted in a corresponding second pair of saddles, the axis of rotation of said second pair of rolling cutters turned outward at an obtuse angle to the central longitudinal axis of said shaft.

2. The bit of claim 1 wherein the second of said drilling stages includes a plurality of rolling cutters removably mounted in a corresponding plurality of saddles, the axis of rotation of said rolling cutters turned outward at an obtuse angle.

3. The bit of claim 2 wherein all of said rolling cutters are the same size.

4. The bit of claim 3 wherein said acute angle is within the range of from 45° to 90°.

5. A bit for enlarging a small-diameter pilot hole into a large-diameter hole comprising:

a central shaft having a central longitudinal axis, said central shaft having an upper end adapted to fit within the pilot hole;

a main bit body attached to said central shaft, said main bit body having a diameter larger than the diameter of the pilot hole;

a plurality of drilling stages positioned on the main bit body, said drilling stages progressively increasing in size;

the first of said drilling stages including a pair of rolling cutters, removably mounted in a corresponding pair of saddles, the axis of rotation of said rolling cutters turned inward at an acute angle to the central axis of said shaft; and the [record] *second* of said drilling stages including a plurality of rolling cutters removably mounted in a corresponding plurality of saddles, the axes of rotation of said plurality of rolling cutters turned outward at an obtuse angle.

6. The bit of claim 5 wherein all cutters are the same size.

7. The bit of claim 5 wherein said acute angle is within the range of from 45° to 90°.

8. The bit of claim 5 wherein said acute angle is approximately 57°.

*9. A bit for enlarging a pilot hole into a large-diameter hole by disintegrating the formations surrounding the pilot hole, comprising:*

*a bit body;*

*a central shaft projecting from said bit body;*

*first rolling cutter means connected to said bit body for contacting and disintegrating formations surrounding the pilot hole, said first rolling cutter means having first cutting surface means for contacting formations surrounding the pilot hole with said first cutting surface means being turned inward toward said central shaft; and*

*second rolling cutter means connected to said bit body for contacting and disintegrating formations surrounding the pilot hole, said second rolling cutter means having second cutting surface means for contacting formations surrounding the pilot hole with said second cutting surface means being turned outward away from said central shaft.*

*10. The bit of claim 9 wherein said first rolling cutter means includes a first pair of rolling cutters, removably mounted in a corresponding pair of saddles with said first pair of rolling cutters having first cutting surfaces that are turned inward toward said central shaft; and wherein said second rolling cutter means includes a plurality of second rolling cutters, removably mounted in a corresponding pair of saddles with said second rolling cutters having second cutting surfaces that are turned outward away from said central shaft.*

*11. A bit for enlarging a small diameter pilot hole into a large diameter hole by disintegrating the formations surrounding the pilot hole and insuring that there will be very little, if any, uncut bottom next to the pilot hole, comprising:*

*a central shaft with a central longitudinal axis, said central shaft having an upper portion with a diameter small enough to fit within said pilot hole;*

*a bit body projecting from said central shaft, said bit body having a diameter larger than the diameter of the upper portion of the central shaft and larger than the diameter of the pilot hole;*

*at least one first rolling cutter positioned on said bit body proximate said central shaft, said first rolling cutter having an axis of rotation, with the angle between said central longitudinal axis and said axis of rotation measured from said upper portion of said central shaft being within the range of from approximately 45° to approximately 90°; and*

*at least one second rolling cutter positioned on said bit, said second rolling cutter having an axis of rotation, with the angle between the central longitudinal axis and said axis of rotation measured from said upper portion of said central shaft being greater than approximately 90°.*

*12. The bit of claim 11 wherein said first rolling cutter includes a first cutting surface for contacting formations surrounding the pilot hole with said first cutting surface being turned inward toward said central shaft; and wherein said second rolling cutter includes a second cutting surface for contacting formations surrounding the pilot hole with said second cutting surface being turned outward away from said central shaft.*

References Cited

The following references, cited by the Examiner, are of record in the patented file of this patent or the original patent.

UNITED STATES PATENTS

| | | | |
|---|---|---|---|
| 839,837 | 1/1907 | Guttzeit | 175—355 X |
| 1,747,908 | 2/1930 | Seifert | 175—334 |
| 2,208,530 | 7/1940 | Thompson | 175—335 |
| 2,703,698 | 3/1955 | Westerman | 175—334 |
| 2,868,510 | 1/1959 | Dean | 175—344 X |
| 2,949,281 | 8/1960 | Baur et al. | 175—356 X |
| 1,826,059 | 10/1931 | Dunn et al. | 174—334 |
| 3,285,355 | 11/1966 | Neilson et al. | 175—334 |
| 1,322,696 | 11/1919 | Hughes | 175—353 |
| 2,064,273 | 12/1936 | Scott | 174—342 X |
| 2,122,808 | 7/1938 | Catland | 174—357 X |
| 3,437,380 | 4/1969 | Lawrence | 175—62 X |

FOREIGN PATENTS

| | | | |
|---|---|---|---|
| 1,257,200 | 2/1961 | France | 175—334 |
| 1,297,278 | 5/1962 | France | 175—53 |

DAVID H. BROWN, Primary Examiner

U.S. Cl. X.R.

175—53, 344